United States Patent
Maekubo et al.

(10) Patent No.: US 8,662,435 B2
(45) Date of Patent: Mar. 4, 2014

(54) WEBBING TAKE-UP DEVICE

(75) Inventors: Yoshiaki Maekubo, Aichi-ken (JP);
Seiji Hori, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 684 days.

(21) Appl. No.: 12/849,551

(22) Filed: Aug. 3, 2010

(65) Prior Publication Data
US 2011/0031340 A1  Feb. 10, 2011

(30) Foreign Application Priority Data
Aug. 7, 2009  (JP) ................. 2009-184517

(51) Int. Cl.
*B60R 22/28*  (2006.01)
*B60R 22/34*  (2006.01)

(52) U.S. Cl.
USPC ..................................... 242/374

(58) Field of Classification Search
USPC ............ 242/376, 379.1, 407, 407.1, 608.5, 242/609.3; 280/805, 807; 297/471, 472, 297/475–478
See application file for complete search history.

(56) References Cited

U.S. PATENT DOCUMENTS

| | | | | |
|---|---|---|---|---|
| 5,820,058 A * | 10/1998 | Hirzel et al. | ............... | 242/379.1 |
| 6,367,729 B1 * | 4/2002 | Inagawa et al. | ............ | 242/379.1 |
| 6,416,008 B1 * | 7/2002 | Fujii et al. | .................. | 242/379.1 |
| 2001/0006203 A1 * | 7/2001 | Mishina et al. | ............ | 242/379.1 |
| 2002/0038834 A1 * | 4/2002 | Mishina et al. | ............ | 242/379.1 |
| 2006/0124795 A1 * | 6/2006 | Clute | ........................... | 242/382 |
| 2006/0163411 A1 * | 7/2006 | Takamatsu et al. | ........ | 242/379.1 |
| 2007/0120001 A1 * | 5/2007 | Esler et al. | ................. | 242/379.1 |

FOREIGN PATENT DOCUMENTS

JP  2001-225719 A  8/2001

* cited by examiner

*Primary Examiner* — Sang Kim
*Assistant Examiner* — Scott Haugland
(74) *Attorney, Agent, or Firm* — Roberts Mlotkowski Safran & Cole P.C.

(57) ABSTRACT

Assembling performance of a torsion bar to a spool is improved. When a webbing take-up device is assembled, the torsion bar is inserted into the spool while catch projections of a serration pillar of the torsion bar are corresponded to insertion grooves of an insertion hole of the spool. Subsequently, in a state where the serration pillar of the torsion bar arrives at an catch hole of the spool, the torsion bar is rotated in a winding direction with respect to the spool, so that the catch projections are caught by catch surfaces of catch grooves of the catch hole, whereby the torsion bar is made non-removable from the spool. Therefore, a direction in which the torsion bar is assembled to the spool is made to be only an axial direction of the spool, and assembling performance of the torsion bar to the spool can be improved.

15 Claims, 8 Drawing Sheets

WEBBING TAKE-UP DEVICE

CROSS-REFERENCE TO RELATED APPLICATION

This application claims priority under 35 USC 119 from Japanese Patent Application No. 2009-184517 filed on Aug. 7, 2009, the disclosure of which is incorporated by reference herein.

BACKGROUND OF THE INVENTION

1. Field of the Invention

The present invention relates to a webbing take-up device in which a torsion bar is mounted to a spool in a non-removable manner.

2. Related Art

Japanese Patent Application Laid-Open (JP-A) No. 2001-225719 discloses a webbing take-up device in which a torsion bar is inserted in a reel in the axial direction of the reel, and the reel and the torsion bar are not relatively rotatable. Further, with a holder member being pressed into the reel in a chord direction, a second torque transmitting portion of the torsion bar made to abut against the holder member, and the torsion bar is brought into a state of being not removable (not separable) from the reel.

However, in the above-described webbing take-up device, a direction in which the torsion bar is inserted in the reel is made to coincide with the axial direction of the reel, while a direction in which the holder member is pressed into the reel is made to coincide with the chord direction of the reel. For this reason, in order to mount the torsion bar to the reel, it is necessary to mount the torsion bar and the holder member to the reel from the directions which intersect each other, thereby leading to poor assembling performance.

SUMMARY OF THE INVENTION

In view of the aforementioned circumstances, the present invention is to provide a webbing take-up device which makes it possible to improve the performance of assembling a torsion bar to a spool.

According to a first aspect of the invention, a webbing take-up device includes: a cylindrical spool on which a webbing to be applied to a passenger of a vehicle is wound; a catch surface that is provided in the spool and disposed in a boundary portion between an insertion groove provided in one side portion within the spool and a catch groove provided in the other side portion within the spool; a torsion bar that is inserted into the spool; and a catch projection that is provided in the torsion bar, wherein the catch projection is caught at the catch surface so that the torsion bar is made to be non-removable from the spool by the torsion bar being rotated in one direction relative to the spool in a state in which the torsion bar is inserted into the spool, and the catch projection passes the insertion groove and arrives at the catch groove.

According to a second aspect of the invention, in the webbing take-up device of the first aspect, the one direction is a webbing winding direction.

According to a third aspect of the invention, the webbing take-up device of the first aspect of the second aspect further includes: a mounting member that is mounted to the torsion bar and prevents relative rotation of the torsion bar in the other direction; and a connecting member that connects the spool and the mounting member with each other, and prevents relative rotation of the mounting member with respect to the spool in the other direction.

According to a fourth aspect of the invention, in the webbing take-up device of any one of the first to third aspects, the catch surface and the catch projection are engaged with each other when the catch projection is caught at the catch surface, so that relative rotation of the torsion bar with respect to the spool in the other direction is prevented.

In the webbing take-up device of the first aspect, a webbing which is to be applied to a passenger of a vehicle is wound on a spool having the shape of a cylinder. Further, the torsion bar is inserted into the spool.

Here, the catch surface is provided within the spool, and the catch surface is disposed in the boundary portion between the insertion groove provided in the one side portion within the spool and the catch groove provided in the other side portion within the spool. Further, the catch projection is provided in the torsion bar. The catch projection is caught at the catch surface so that the torsion bar is made to be non-removable from the spool by the torsion bar being rotated relatively in one direction with respect to the spool in a state in which the torsion bar is inserted into the spool, and the catch projection passes the insertion groove and arrives at the catch groove.

In this manner, the torsion bar is made to be non-removable from the spool by only the torsion bar being inserted into the spool and also being rotated in the one direction relatively with respect to the spool. Therefore, a direction in which the torsion bar is assembled to the spool can be made to coincide with only a direction parallel to a direction to which the torsion bar is inserted into the spool, whereby the performance of assembling the torsion bar to the spool can be improved.

It is possible that the catch surface is perpendicular to an axis direction of the spool, or it is possible that the catch surface is inclined at at lease a portion thereof, such that the catch surface becomes closer to an end of the spool at the other side portion approaching the one direction side.

Further, it is possible that a projection for preventing the catch projection from relatively moving in the other direction is formed at at least one of the catch projection or the catch surface.

Further, it is possible that a plurality of the catch surfaces are disposed at equal intervals in a circumferential direction of the spool, and a plurality of the catch projections are disposed at equal intervals in a circumferential direction of the torsion bar, or it is possible that a plurality of the catch surfaces are disposed at a portion of an area in a circumferential direction of the spool, and a plurality of the catch projections are disposed at a portion of an area in a circumferential direction of the torsion bar.

In the webbing take-up device of the second aspect, the above-described one direction is made to coincide with the webbing winding direction. For this reason, when pull-out force acts on the webbing, relative rotation force in the other direction with respect to the torsion bar acts on the spool, that is to say, relative rotation force in the one direction with respect to the spool acts on the torsion bar. Accordingly, catching of the catch projection with the catch surface can be maintained and removal of the torsion bar from the spool can be prevented.

In the webbing take-up device of the third aspect, the mounting member is mounted to the torsion bar, and the mounting member prevents relative rotation of the torsion bar in the other direction. Further, the connecting member causes the spool and the mounting member to be connected to each other. The connecting member prevents relative rotation of the mounting member with respect to the spool in the other direction. For this reason, due to the relative rotation of the torsion bar with respect to the spool in the other direction being prevented via the mounting member, it is possible to prevent removal of the torsion bar from the spool, which is caused by cancellation of catch between the catch projection and the catch surface. Further, as compared to a case in which relative rotation of the torsion bar with respect to the spool in the other direction is directly prevented, relative rotation of the torsion bar with respect to the spool in the other direction can be firmly prevented.

It is possible that a spool side hole is formed at the spool and a mounting member side hole is formed at the mounting member, the connecting member being inserted into the spool side hole and the mounting member side hole.

In the webbing take-up device of the fourth aspect, when the catch projection is caught at the catch surface, the catch surface and the catch projection are engaged with each other and relative rotation of the torsion bar with respect to the spool in the other direction is prevented. For this reason, it is possible to prevent, by a simple operation, removal of the torsion bar from the spool, which results from by cancellation of catch of the catch projection with the catch surface.

BRIEF DESCRIPTION OF THE DRAWINGS

Embodiments of the invention will be described in detail with reference to the following figures, wherein:

FIG. 3A and FIG. 3B are cross sectional views (taken along line 3-3 in FIG. 1) each showing a webbing take-up device according to a first embodiment of the invention.

FIGS. 7A and 7B are cross sectional views (taken along a line 3-3 in FIG. 1) each showing a webbing take-up device according to a fourth embodiment of the invention.

DETAILED DESCRIPTION OF THE INVENTION

First Embodiment

Figure 1:
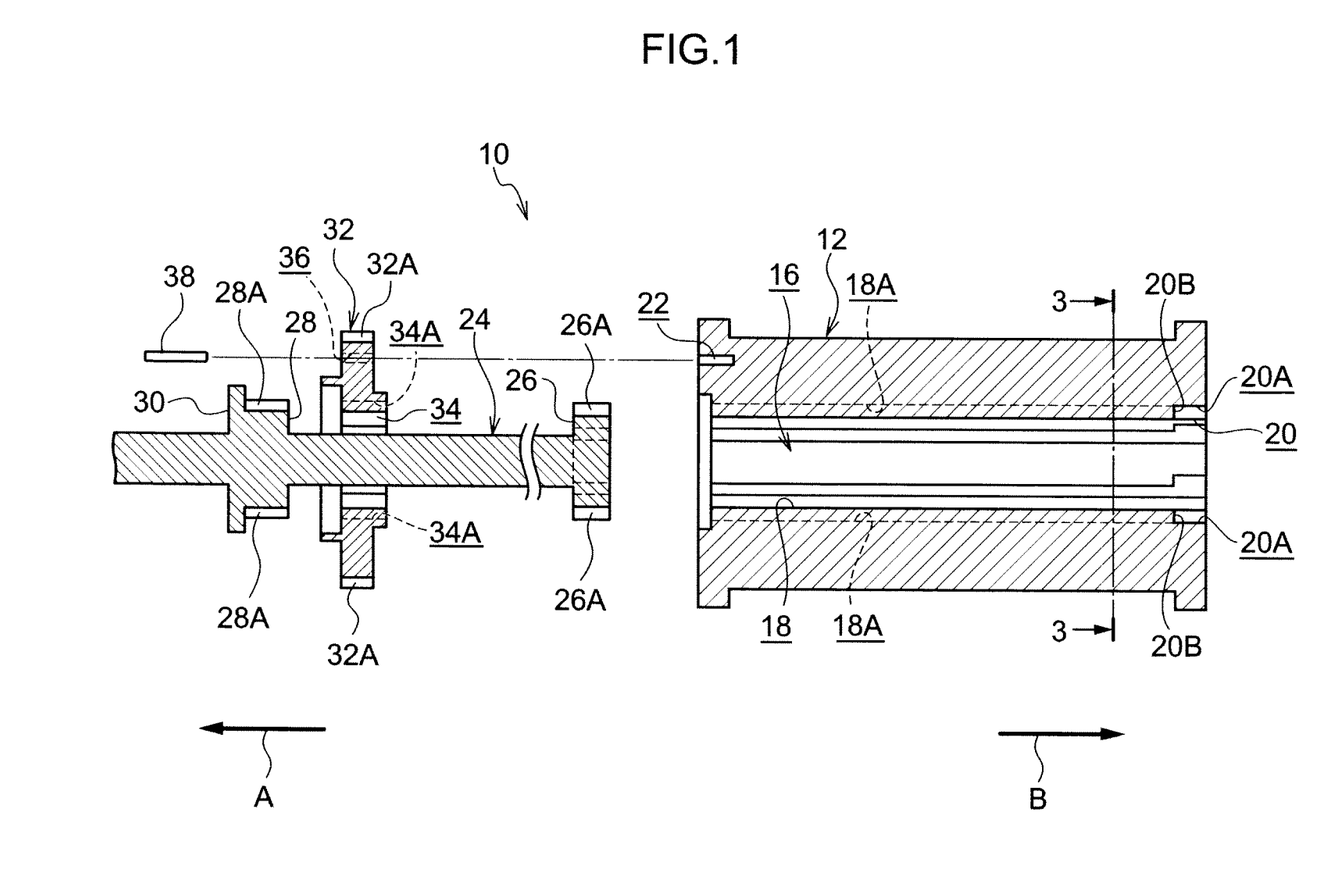
FIG. 1 is an exploded cross sectional view showing a webbing take-up device according to a first embodiment of the invention when seen from sideways.
Figure 2:
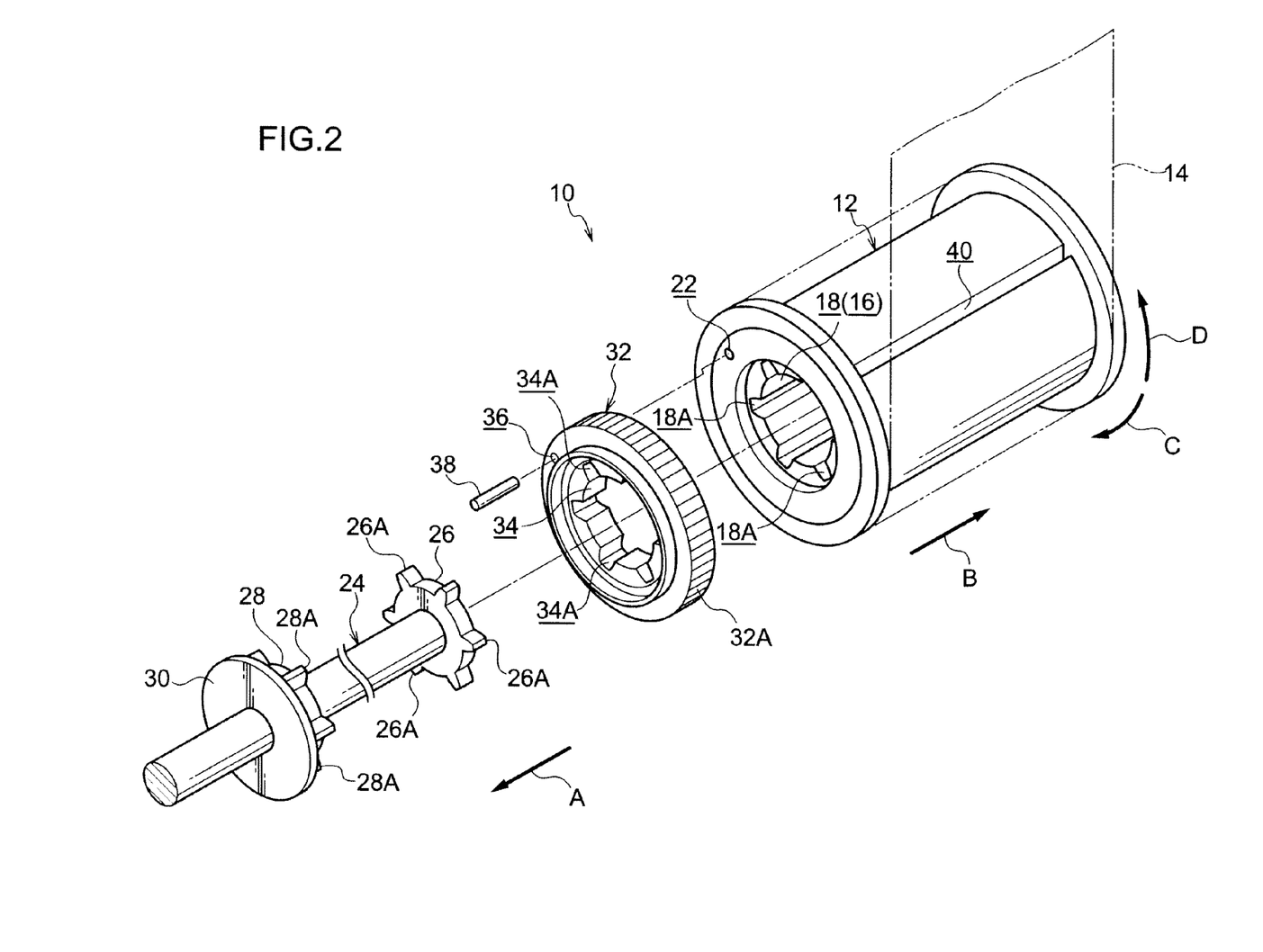
FIG. 2 is an exploded cross sectional view showing a webbing take-up device according to a first embodiment of the invention.

FIG. 1 is an exploded cross sectional view of a webbing take-up device 10 according to a first embodiment of the invention when seen from sideways, and FIG. 2 is an exploded perspective view of the webbing take-up device 10. Note that in these figures, one side of the webbing take-up device 10 is indicated by arrow A and the other side of the webbing take-up device 10 is indicated by arrow B.

As shown in FIGS. 1 and 2, the webbing take-up device 10 according to the present embodiment includes a cylindrical (tube-shaped) spool 12 serving as a take-up member which forms a winding shaft. The spool 12 is formed by casting. The spool 12 is supported rotatably by a frame (not shown) fixed to a vehicle body at both end portions in the axial direction of the spool.

Figure 3A:
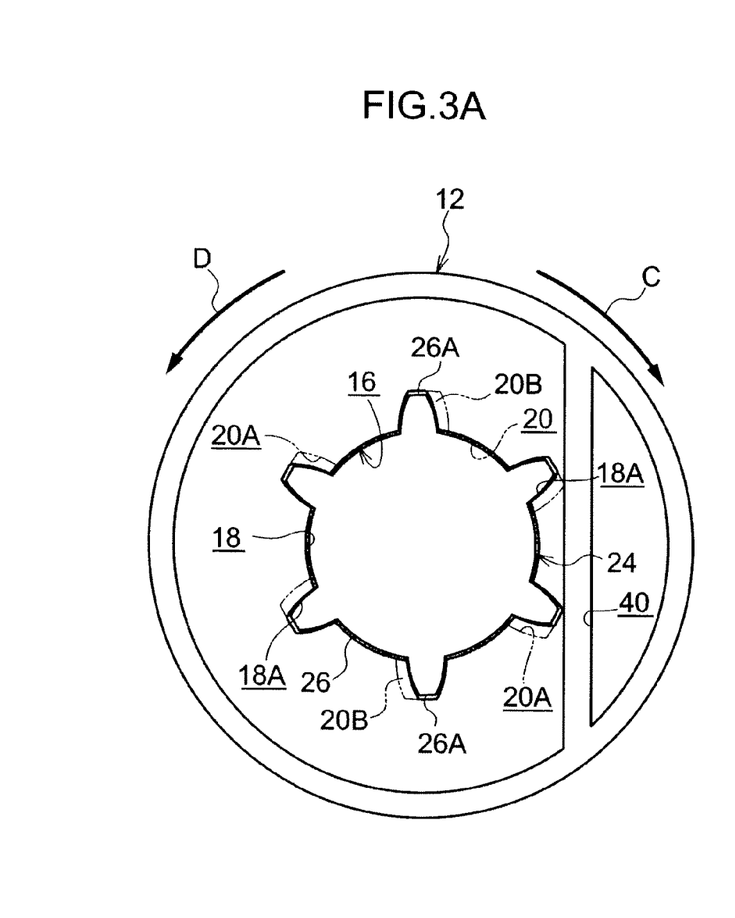
FIG. 3A is a view showing a case in which a torsion bar is inserted in a spool.
Figure 3B:
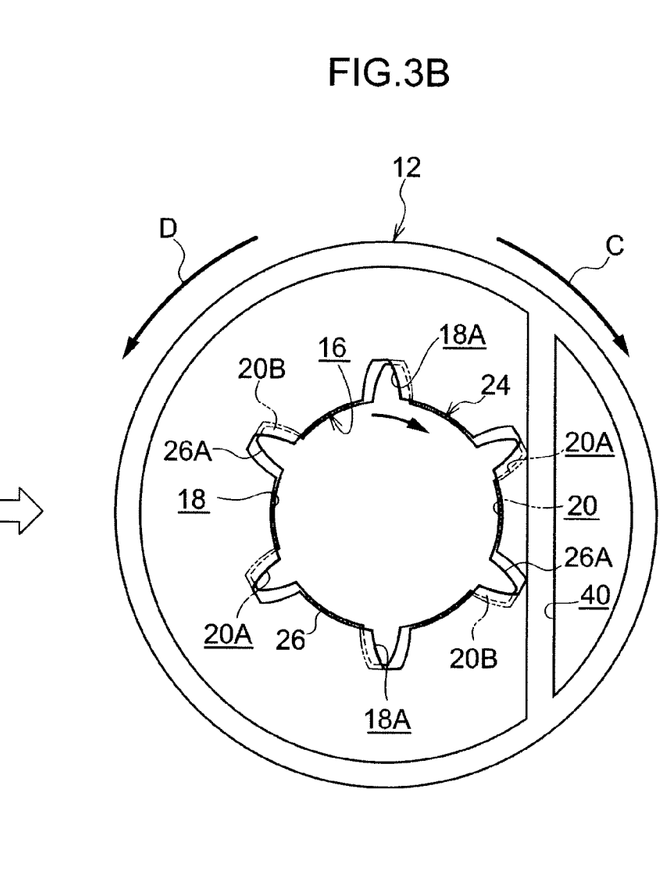
FIG. 3B is a view showing a case in which the torsion bar is rotated in a winding direction with respect to the spool in a state in which the torsion bar is inserted in the spool.

As shown in FIG. 2, an elongated rectangular-shaped insertion hole 40 is formed in the spool 12 in a portion not including both end portions in the axial direction of the spool, and the insertion hole 40 is formed so as to pass through the spool 12 along a chord direction of the spool 12 (refer to FIGS. 3A and 3B). An elongated band-shaped webbing 14 (a seat belt) is made to pass through the insertion hole 40 in a state in which a base end portion of the webbing is prevented from being falling off from the insertion hole 40. The webbing 14 is wound up onto the spool 12 from the side of the base end thereof, and is putted on a vehicle passenger (occupant). Due to the spool 12 being rotated in the winding direction (in a direction indicated by arrow C in FIG. 2, i.e., in one direction), the webbing 14 is wound up onto the spool 12. Further, due to the webbing 14 being pulled out from the spool 12, the spool 12 is rotated in a direction in which the webbing is pulled out (in a direction indicated by arrow D in FIG. 2, i.e., in the other direction).

As shown in FIG. 1 and FIG. 2, the spool 12 includes a serration hole 16 serving as a mounting hole and formed so as to pass through along the central axis of the spool.

A part of the serration hole 16 not including the other side end portion is made to become an insertion hole 18, and a predetermined number of (in the present embodiment, six) insertion grooves 18A each having a substantially trapezoidal cross section is formed on the outer periphery of the insertion hole 18. The insertion grooves 18A are each made to extend parallel to the axial direction of the spool 12, and the predetermined number of insertion grooves 18A is arranged at equal intervals in the circumferential direction of the spool 12.

The other side end portion of the serration hole 16 is formed as a catch (engage and stop) hole 20. A predetermined number of (in the present embodiment, six) catch (engage and stop) grooves 20A each having a substantially trapezoidal cross section are formed on the outer periphery of the catch hole 20. The catch grooves 20A are each made to extend along the axial direction of the spool 12. The predetermined number of catch grooves 20A is arranged at equal intervals in the circumferential direction of the spool 12.

As shown in FIGS. 3A and 3B, in the spool 12, the insertion hole 40 is disposed further at the outer side in the radial direction of the spool 12 than the insertion grooves 18A and the catch grooves 20A. The pull-out direction side of the insertion groove 18A and the pull-out direction side of the catch groove 20A are arranged such that phases thereof are made identical in the circumferential direction of the spool 12. The winding direction side of the insertion groove 18A and the winding direction side of the catch groove 20A are arranged such that phase of the winding direction side of the catch groove 20A is further at the side in the winding direction than phase of the winding direction side of the insertion groove 18A. Further, as specifically shown in FIG. 1, a surface of the catch groove 20A at the one side (at the side of the insertion hole 18) in the winding direction side portion of the catch groove 20A is formed as a catch (engage and stop) surface 20B, and the catch surface 20B is oriented perpendicular with respect to the axial direction of the spool 12.

As shown in FIG. 1 and FIG. 2, a predetermined number of (in the present embodiment, one) circular stopping hole 22 is formed on the one side surface of the spool 12 at the outer periphery side of the serration hole 16.

A torsion bar 24 serving as an insertion member (an energy absorbing member) which forms a winding shaft (a force limiter mechanism) is inserted in the serration hole 16 of the spool 12, and the torsion bar 24 is formed by casting.

A serration pillar 26 serving as a catch (engage and stop) portion is formed integrally and coaxially with the other side end of the torsion bar 24, and a predetermined number of (in the present embodiment, six) catch (engage and stop) projections 26A each having a substantially trapezoidal pillar-shaped configuration is formed on the outer periphery of the serration pillar 26. The catch projections 26A are each made to extend parallel to the axial direction of the torsion bar 24. The predetermined number of catch projections 26A is arranged at equal intervals in the circumferential direction of the torsion bar 24.

Figure 4:
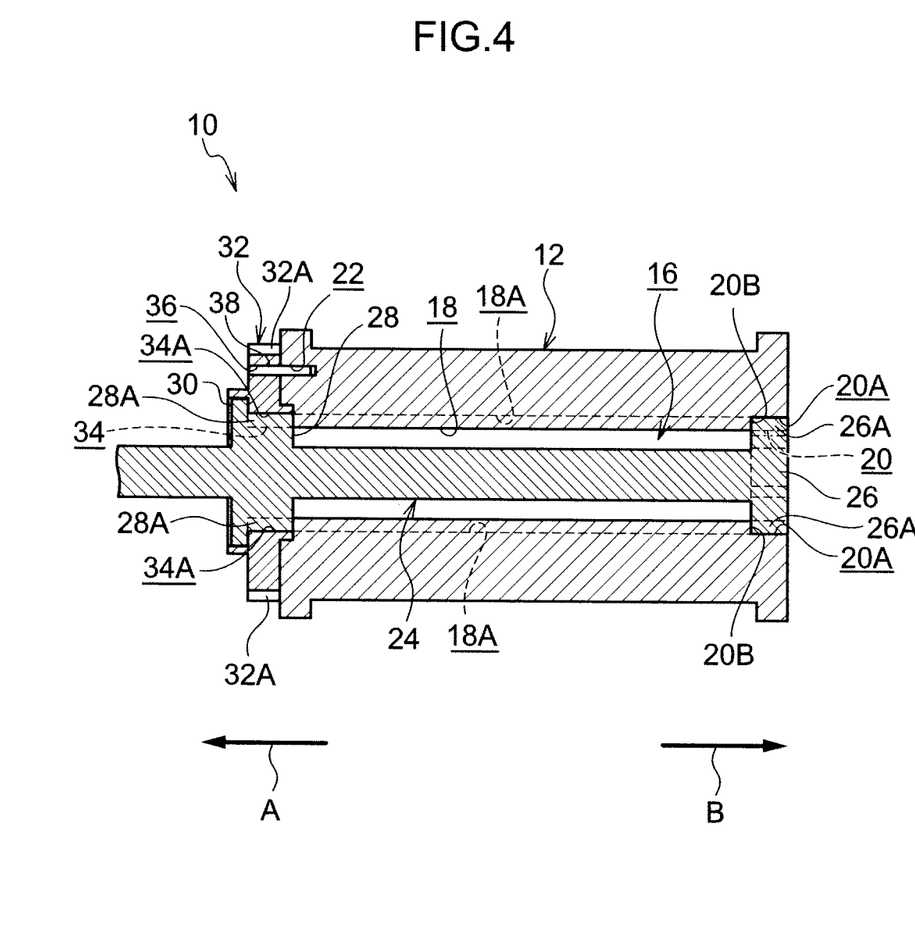
FIG. 4 is a cross sectional view showing a webbing take-up device according to a first embodiment of the invention when seen from sideways.

The torsion bar 24 is inserted in the serration hole 16 of the spool 12 form the one side while the catch projections 26A of the serration pillar 26 are matched (corresponded) with the insertion grooves 18A of the insertion hole 18 of the spool 12. Further, as shown in FIG. 3A, the serration pillar 26 arrives at the catch hole 20 of the spool 12 and the catch protrusions 26A of the serration hole 26 arrive at the catch grooves 20A of the catch hole 20. In this state, as shown in FIG. 3B and FIG. 4, the torsion bar 24 is rotated by a predetermined angle in the winding direction with respect to the spool 12, the catch projections 26A are each inserted in the winding direction side portion of the catch groove 20A.

As a result, the catch projection 26A is caught with the catch surface 20B of the catch groove 20A, so that the torsion bar 24 is made non-removable from the spool 12 to the one side (the torsion bar 24 is mounted (assembled) to the spool 12). At the same time, the winding direction side surface of the catch groove 20A is caught with the catch projection 26A, so that rotation of the spool 12 with respect to the torsion bar 24 in the pull-out direction is prevented (stopped).

As shown in FIG. 1 and FIG. 2, a fit pillar 28 serving as a stopping portion is formed integrally with a portion of the torsion bar 24 at the one side and coaxially with the torsion bar 24. A predetermined number of (in the present embodiment, six) fit projections 28A each having a trapezoidal pillar-shaped configuration is formed on the outer periphery of the fit pillar 28. The fit projections 28A are each made to extend parallel to the axial direction of the torsion bar 24. The predetermined number of fit projections 28A is arranged at equal intervals in the circumferential direction of the torsion bar 24. Further, the fit pillar 28 (including the fit projections 28A) is made to have the same cross sectional configuration as that of the serration pillar 26 (including the catch projections 26A).

A circular plate-shaped contact (abut) plate 30 serving as a contact (abut) portion is formed at the one side (the side opposite to a side at which the spool 12 is disposed) of the fit pillar 28 and integrally with and coaxially with the torsion bar 24. The contact plate 30 is formed integrally with the fit pillar 28 (including the catch projections 28A), and the radial direction of the contact plate is made larger than that of the fit pillar 28 (including the fit projections 28A).

A look gear 32 serving as a mounting member (a lock member) of a stopping section is provided at the one side (at the side at which the contact plate 30 is disposed) of the spool 12.

A fit hole 34 serving as a blocking hole is formed in a lock gear 32 along the central axis of the lock gear so as to pass through the lock gear, and a predetermined number of (in the present embodiment, six) fit grooves 34A each having a substantially trapezoidal configuration are formed on the outer periphery of the fit hole 34. The fit grooves 34A are each made to extend parallel to the axial direction of the lock gear 32. The predetermined number of fit grooves 34A is arranged at equal intervals in the circumferential direction of the lock gear 32. Further, the fit hole 34 (including the fit grooves 34A) has the same cross sectional configuration as that of the insertion hole 18 (including the insertion grooves 18A) of the spool 12.

The torsion bar 24 is inserted from the one side into the fit hole 34 of the lock gear 32 with the catch projections 26A of the serration pillar 26 of the torsion bar 24 being engaged with the fit grooves 34A of the fit hole 34, respectively.

As shown in FIG. 4, the catch projections 28A of the fit pillar 28 of the torsion bar 24 are fitted with the fit grooves 34A of the fit hole 34, respectively. For this reason, rotation of the torsion bar 24 in the winding direction and the pull-out direction with respect to the lock gear 32 is prevented (stopped). The surface of the lock gear 32 at the side of the spool 12 is made to abut against the spool 12, and the surface of the lock gear 32 at the side opposite to the side of the spool 12 is made to abut against the contact plate 30 of the torsion bar 24. For this reason, movement of the lock gear 32 to both sides in the axial direction is prevented (stopped) by the spool 12 and the contact plate 30, and movement of the torsion bar 24 to the side of the spool 12 (to the other side) is prevented (it is caught). As a result, the lock gear 32 and the torsion bar 24 are both mounted to the spool 12.

As shown in FIG. 2 and FIG. 4, on the one side surface of the lock gear 32, a predetermined number of (in the present embodiment, one) circular connecting hole 36 is formed at the outer periphery side of the fit hole 34 so as to pass through the lock gear 32. The position of the connecting hole 36 in the radial direction of the lock gear 32 coincides with the position of the stopping hole 22 in the radial direction of the spool 12. When the fit projections 28A of the fit pillar 28 of the torsion bar 24 are fit in the fit grooves 34A of the fit hole 34 of the lock gear 32 and the catch projections 26A of the serration pillar 26 of the torsion bar 24 are matched (corresponded) to the insertion grooves 18A of the insertion hole 18 of the spool 12, the position of the connecting hole 36 in the circumferential direction of the lock gear 32 is located at a position shifted in the pull-out direction by a predetermined angle with respect to the position of the stopping hole 22 in the circumferential direction of the spool 12. Subsequently, the torsion bar 24 is rotated by a predetermined angle in the winding direction with respect to the spool 12 in such a manner as to be integral with the lock gear 32 (i.e., the catch projections 26A of the torsion bar 24 are caught with the catch surfaces 20B of the spool 12), whereby the position of the connecting hole 36 in the circumferential direction of the lock gear 32 is made to coincide with the position of the stopping hole 22 in the circumferential direction of the spool 12.

A circular cylinder-shaped shear pin 38 serving as a connecting section (a connecting member) of the stopping section is pressed into the connecting hole 36 of the lock gear in the axial direction of the lock gear 32. The shear pin 38 is also pressed into the stopping hole 22 of the spool 12 in the axial direction of the spool 12. As a result, rotation of the lock gear 32 in the winding direction and in the pull-out direction with respect to the spool 12 is prevented.

The lock gear 32 forms a lock mechanism (a regulating section), and ratchet teeth 32A (lock teeth) are formed entirely on the outer periphery surface of the lock gear 32. In case of emergency of a vehicle (a vehicle collision or the like), the lock mechanism is activated so that rotation of the lock gear 32 in the pull-out direction is locked (regulated).

Next, operation of the present embodiment is described.

In the webbing take-up device 10 having the above-described structure, the webbing 14 is putted on the vehicle passenger, and in case of emergency of the vehicle, the lock mechanism is activated, so that rotation of the lock gear 32 in the pull-out direction is locked. As a result, rotation of the torsion bar 24 and the spool 12 in the pull-out direction is limited, so that pull-out of the webbing 14 from the spool 12 is restricted, whereby the vehicle passenger is restrained by the webbing 14.

When, in the case emergency of the vehicle, locomotive (moving) force such as inertial force is applied to the vehicle passenger, and a tensile load acting on the webbing 14 from the vehicle passenger reaches a predetermined load (a force limiter load) or larger, a force limiter mechanism is activated, so that the shear pin 38 is broken in a portion between the look gear 32 and the spool 12 due to rotating force of the spool 12 in the pull-out direction with respect to the lock gear 32. Thus, rotation of the spool 12 in the pull-out direction with respect to the lock gear 32 is permitted.

The fit pillar 28 (including the fit projections 28A) of the torsion bar 24 is prevented from rotating in the winding direction and in the pull-out direction with respect to the fit hole 34 (including the fit grooves 34A) of the lock gear 32. Further, the catch hole 20 (including the catch grooves 20A) of the spool 12 is prevented from rotating in the pull-out direction with respect to the serration pillar 26 (including the catch projections 26A) of the torsion bar 24.

As a result, after the shear pin 38 is broken between the lock gear 32 and the spool 12 as described above, the spool 12 is rotated in the pull-out direction while the torsion bar 24 is being made to twist-deformed around the shaft between the fit pillar 28 and the serration pillar 26, so that the webbing 14 is pulled out from the spool 12. For this reason, kinetic energy of the vehicle passenger is absorbed by twist deformation of the torsion bar 24.

Further, when the webbing take-up device 10 is assembled, first, the fit projections 26A of the serration pillar 26 of the torsion bar 24 are matched to the fit grooves 34A of the fit hole 34 of the lock gear 32, respectively, and the torsion bar 24 is inserted to pass through the fit hole 34 of the lock gear 32. Moreover, the fit projections 28A of the fit pillar 28 of the torsion bar 24 are fitted to the fit grooves 34A of the fit hole 34 of the lock gear 32, respectively, so as to prevent the torsion bar 24 from rotating both in the winding direction and in the pull-out direction with respect to the lock gear 32. Also, the torsion bar 24 is inserted in the serration hole 16 of the spool 12 while the catch projections 26A of the serration pillar 26 of the torsion bar 24 are being matched to the insertion grooves 18A of the insertion hole 18 of the spool 12. At this time, the position of the connecting hole 36 in the peripheral direction of the lock gear 32 is disposed so as to be shifted in the pull-out direction by a predetermined angle with respect to the position of the stopping hole 22 in the peripheral direction of the spool 12.

Subsequently, in the state in which the serration pillar 26 of the torsion bar 24 is made to arrive at the catch hole 20 of the spool 12, the torsion bar 24 is rotated, integrally with the lock gear 32, by a predetermined angle in the winding direction with respect to the spool 12, whereby the position of the connecting hole 36 in the peripheral direction of the lock gear 32 is made to coincide with the position of the stopping hole 22 in the peripheral direction of the spool 12, and the catch projections 26A of the serration pillar 26 are caught with winding-direction side surfaces of the corresponding catch grooves 20A of the catch hole 20.

As a result, rotation of the spool 12 in the pull-out direction with respect to the torsion bar 24 is prevented. Further, the catch projections 26A are respectively caught with the catch surfaces 20B of the catch grooves 20A, so that the torsion bar 24 is made to be non-removable from the spool 12. In addition, the lock gear 32 is made to abut against (caught by) the spool 12 and the contact plate 30 of the torsion bar 24, so that movement of the lock gear 32 to both side in the axial direction thereof is prevented and movement of the torsion bar 24 to the side of the spool 12 is also prevented.

Finally, the shear pin 38 is press into the connecting hole 36 of the lock gear 32 and the stopping hole 22 of the spool 12, so as to prevent the lock gear 32 from rotating both in the winding direction and in the pull-out direction with respect to the spool 12.

As described above, the torsion bar 24 inserted to pass through the fit hole 34 of the lock gear 32 is inserted in the serration hole 16 of the spool 12. Thereafter, the torsion bar 24 is rotated in the winding direction with respect to the spool 12, whereby the torsion bar 24 (the catch projections 26A of the serration pillar 26) is caught with the spool 12 (the catch surfaces 20B of the catch grooves 20A of the catch hole 20), and the torsion bar 24 is made to be not-removable from the spool 12. For this reason, the direction to which the torsion bar 24 is mounted in the spool 12 can be made to be only the axial direction of the spool 12, and the assembling performance of the torsion bar 24 with respect to the spool 12 can be improved.

Moreover, in the spool 12, a portion at the one side (at the side of the lock gear 32) further than the catch surface 20B is made longer in the axial direction of the spool, so that the rigidity of the catch surface 20B is made higher, moreover, the hardness of the torsion bar 24 (including the catch projections 26A) is made higher by being formed by casting. For this reason, the strength at which the catch projection 26A of the torsion bar 24 is caught with the catch surface 20B of the spool 12 can be made higher, and the assembling strength of the torsion bar 24 with respect to the spool 12 can be made higher.

The predetermined number of the catch projections 26A of the torsion bar 24 are caught with the predetermined number of the catch surfaces 20B of the spool 12, respectively, in equal manner in the circumferential direction of the spool 12. For this reason, it is possible to prevent the axial direction of the torsion bar 24 from being inclined with respect to the central axis of the spool 12.

Furthermore, as described above, due to the fit projections 28A of the fit pillar 28 of the torsion bar 24 being fitted with the fit grooves 34A of the fit hole 34 of the lock gear 32, rotation of the torsion bar 24 both in the winding direction and in the pull-out direction with respect to the lock gear 32 is prevented. In addition, due to the shear pin 38 being pressed into the connecting hole 36 of the lock gear 32 and the stopping hole 22 of the spool 12, rotation of the lock gear 32 and the torsion bar 24 both in the winding direction and in the pull-out direction with respect to the spool 12 is prevented.

To this end, it is possible to prevent that catching of the torsion bar 24 (the catch projections 26A of the serration pillar 26) with the spool 12 (the catch surfaces 20B of the catch grooves 20A of the catch hole 20) is released thereby the torsion bar 24 is removed from the spool 12. In addition, rotation of the torsion bar 24 both in the winding direction and in the pull-out direction with respect to the spool 12 is inhibited via the lock gear 32, and therefore, as compared to a case in which rotation of the torsion bar 24 both in the winding direction and in the pull-out direction with respect to the spool 12 is directly inhibited, rotation of the torsion bar 24 both in the winding direction and in the pull-out direction with respect to the spool 12 can be firmly prevented.

Further, the direction in which the shear pin 38 is pressed into the connecting hole 36 of the lock gear 32 and the stopping hole 22 of the spool 12 is made to coincide with the axial direction of the lock gear 32 and the axial direction of the spool 12, and also made parallel to the direction in which the torsion bar 24 is inserted in the spool 12. For this reason, an operation for preventing catch of the torsion bar 24 (catch projections 26A) with the spool 12 (catch surfaces 20B) from being released can be performed in a direction parallel to that for operation of inserting the torsion bar 24 in the spool 12, and operability can be improved.

In addition, an existing shear pin 38 which prevents relative rotation of the spool 12 and the lock gear 32 (in the case of emergency of the vehicle, the shear pin is broken so as to permit relative rotation of the spool 12 and the lock gear 32) is used to prevent rotation of the torsion bar 24 both in the winding direction and in the pull-out direction with respect to the spool 12. For this reason, no special parts used to prevent removal of the torsion bar 24 from the spool 12, which is caused by cancellation of catch between the torsion bar 24 and the spool 12, is required, and the number of parts can be reduced.

As described above, the catch projection 26A of the serration pillar 26 of the torsion bar 24 is caught with the winding-direction side surface of the catch groove 20A of the spool 12, so that rotation of the spool 12 in the pull-out direction with respect to the serration pillar 26 of the torsion bar 24 is prevented. Further, in case of an emergency of the vehicle, the lock mechanism is activated and rotation of the lock gear 32 and the fit pillar 28 of the torsion bar 24 in the pull-out direction is locked.

Consequently, in case of an emergency of the vehicle, even if the force limiter mechanism is activated so that the shear pin 38 is broken at the portion between the lock gear 32 and the spool 12, a tensile load acting on the spool 12 from the vehicle passenger via the webbing 14 in the pull-out direction causes the winding-direction side surface of the catch groove 20A of the spool 12 to be caught with the catch projection 26A of the serration pillar 26 of the torsion bar 24. As a result, the relative rotation of the spool 12 and the serration pillar 26 of the torsion bar 24 being stopped, it is possible to prevent removal of the torsion bar 24 from the spool 12, which is caused by cancellation of catch of the torsion bar 24 (the catch projections 26A) with the spool 12 (the catch surfaces 20B of the catch grooves 20A).

Second Embodiment

Figure 5A:
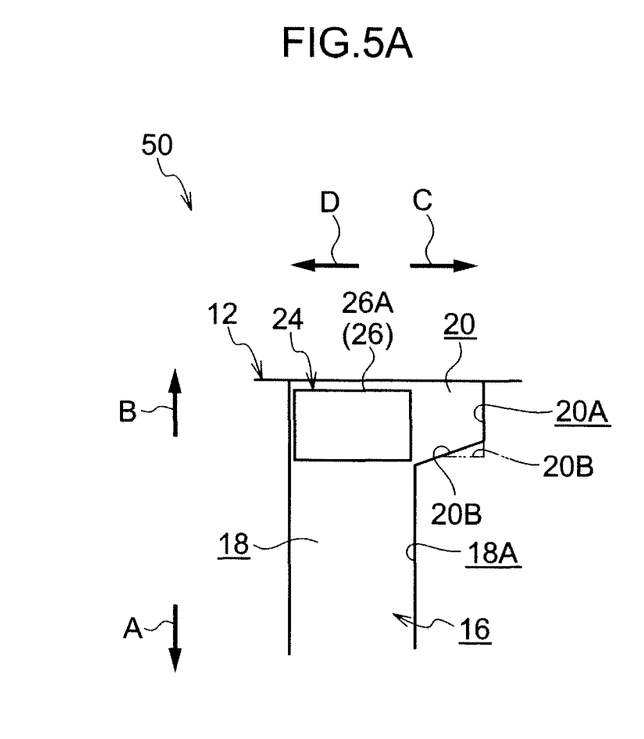
FIGS. 5A and 5B are cross sectional views showing a principal part of a webbing take-up device according to a second embodiment of the invention.
Figure 5B:
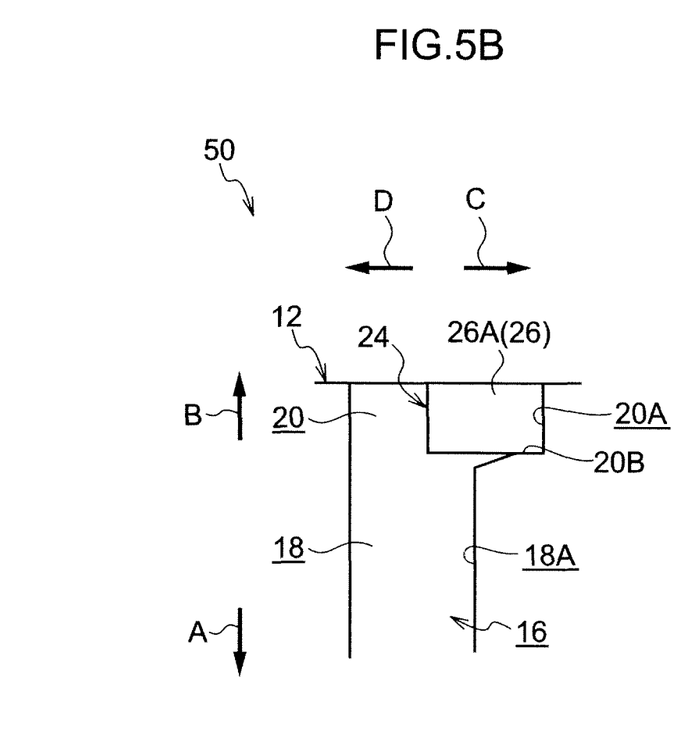

FIGS. 5A and 5B each show a principal part of a webbing take-up device 50 according to a second embodiment of the invention.

The webbing take-up device 50 according to the second embodiment has substantially the same structure as that of the first embodiment excepting the following structure.

In the webbing take-up device 50 according to the second embodiment, the stopping hole 22 of the spool 12, the connecting hole 36 of the lock gear 32, and the shear pin 38 shown in the above-described first embodiment are not provided.

As shown in FIG. 5A, the catch surface 20B of the spool 12, which serves as a stopping section, is inclined such that the catch surface 20B becomes closer to (nearer) the other side end of the spool 12 in approaching the side of the winding direction, (that is, is inclined toward the side of the winding direction and the other side of the spool 12).

In this case, due to the torsion bar 24 being inserted in the serration hole 16 of the spool 12 from the one side, the serration pillar 26 of the torsion bar 24 arrives at the catch hole 20 of the serration hole 16 and the catch projections 26A of the serration pillar 26 arrive at the catch grooves 20A of the catch hole 20.

Further, in the above-described state, as shown in FIG. 5B, due to the torsion bar 24 being rotated in the winding direction with respect to the spool 12, the catch projection 26A is inserted in the winding-direction side portion of the catch groove 20A, and the catch projection 26A is caught with the catch surface 20B of the catch groove 20A.

When the catch projection 26A is caught with the catch surface 20B, movement of the torsion bar 24 to the other side with respect to the spool 12 is prevented by the spool 12 via the lock gear 32. Therefore, the catch surface 20B is scraped by the catch projection 26A while the catch projection 26A is moved with respect to the catch surface 20B. As a result, contact pressure occurring between the catch projection 26A and the catch surface 20B is made extremely high, and frictional force (force of engagement) between the catch projection 26A and the catch surface 20B is also made extremely high, whereby rotation of the torsion bar 24 in the pull-out direction with respect to the spool 12 is prevented by frictional force between the catch projection 26A and the catch surface 20B.

In this case, in the second embodiment as well, the same operation and effect as those of the first embodiment can be obtained excepting the effect obtained by a configuration in which rotation of the torsion bar 24 both in the winding direction and in the pull-out direction with respect to the spool 12 is inhibited via the lock gear 32.

Further, as described above, by the torsion bar 24 being rotated in the winding direction with respect to the spool 12, due to frictional force between the catch projection 26A and the catch surface 20B, rotation of the torsion bar 24 in the pull-out direction with respect to the spool 12 is prevented. For this reason, it is possible to prevent rotation of the torsion bar 24 in the pull-out direction with respect to the spool 12 by a simple operation, and no special parts used for preventing removal of the torsion bar 24 from the spool 12, which is caused by cancellation of engagement of the torsion bar 24 with the spool 12, are required, and the number of parts can be reduced.

In the second embodiment, as indicated by the solid line in FIG. 5A, a configuration in which the catch surface 20B is entirely inclined such that the catch surface 20B becomes closer to (nearer) the other side end of the spool 12 in approaching the side of the winding direction is shown. However, as indicated by the two-dot chain line in FIG. 5A, a configuration in which a portion of the catch surface 20B at the side of the pull-out direction is inclined such that the portion becomes closer to (nearer) the other side end of the spool 12 in approaching the side of the winding direction, (that is, is inclined toward the side of the winding direction and the other side of the spool 12). Further, a portion of the catch surface 20B at the side of the winding direction is arranged perpendicularly with respect to the axial direction of the spool 12 may also be provided.

Further, in the second embodiment, a configuration in which the catch surface 20B is inclined such that the catch surface 20B becomes closer to (nearer) the other side end of the spool 12 in approaching the side of the winding direction is provided. However, an alternative configuration in which one side surface of the catch projection 26A is inclined such that the one side surface of the catch projection 26A becomes closer to (nearer) the other side end of the spool 12 in approaching the side of the winding direction (that is, is inclined toward the side of the winding direction and the other side of the spool 12) may also be provided.

Third Embodiment

Figure 6A:
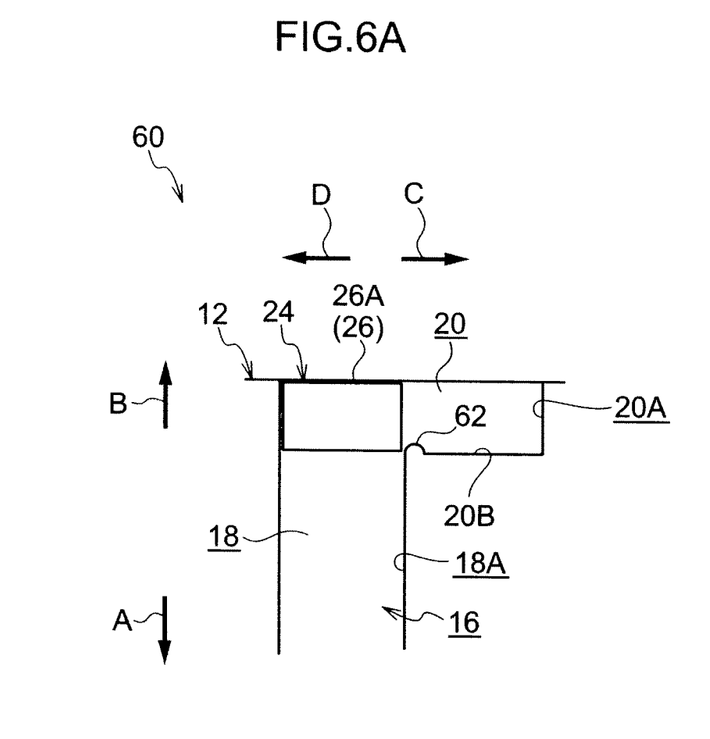
FIGS. 6A and 6B are cross sectional views showing a principal part of a webbing take-up device according to a third embodiment of the invention.
Figure 6B:
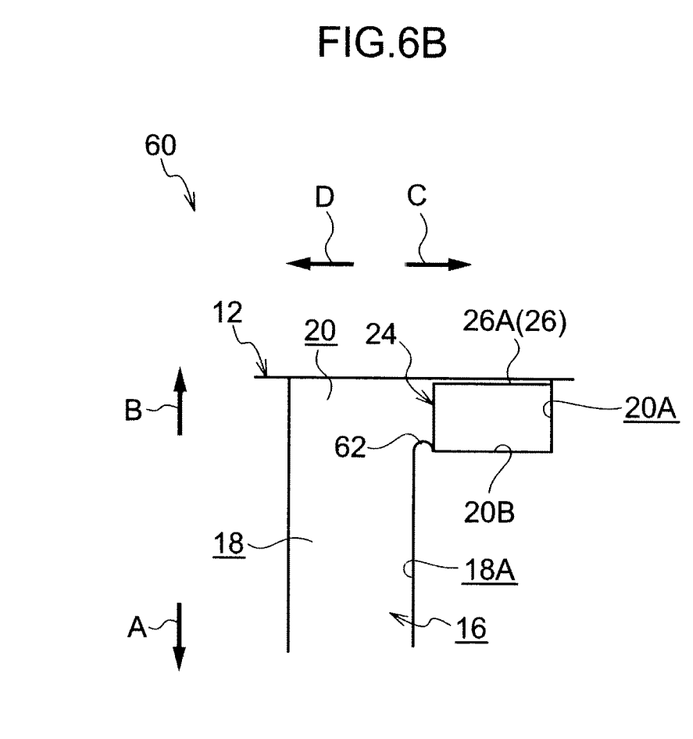

FIGS. 6A and 6B each show a principal part of a webbing take-up device 60 according to a third embodiment of the invention.

The webbing take-up device 60 according to the third embodiment has substantially the same structure as that of the first embodiment excepting the following structure.

In the webbing take-up device 60 according to the third embodiment, the stopping hole 22 of the spool 12, the connecting hole 36 of the lock gear 32 and the shear pin 38 shown in the above-described first embodiment are not provided.

As shown in FIG. 6A, a stropping projection 62 serving as a stopping section and having a semicircular cross section is formed at an end of the catch surface 20B of the spool 12 at the side of the pull-out direction. The stopping projection 62 is made to project from the catch surface 20B to the other side.

In this case, due to the torsion bar 24 being inserted in the serration hole 16 of the spool 12 from the one side, the serration pillar 26 of the torsion bar 24 arrives at the catch hole 20 of the serration hole 16 and the catch projection 26A of the serration pillar 26 arrives at the catch groove 20A of the catch hole 20.

Further, in the above-described state, due to the torsion bar 24 being rotated in the winding direction with respect to the spool 12 as shown in FIG. 6B, the catch projection 26A is inserted in a portion of the catch groove 20A at the side of the winding direction and the catch projection 26A is caught with the catch surface 20B of the catch groove 20A.

When the catch projection 26A is caught with the catch surface 20B, in a state in which movement of the torsion bar 24 to the other side with respect to the spool 12 is prevented by the spool 12 via the lock gear 32, the catch projection 26A is forcibly moved toward the catch surface 20B and gets over the stopping projection 62. As a result, movement of the catch projection 26A in the pull-out direction is prevented by the stopping projection 62 (the catch projection 26A is engaged with the stopping projection 62 of the catch surface 20B), and rotation of the torsion bar 24 in the pull-out direction with respect to the spool 12 is prevented.

Here, in the present embodiment as well, with exception of the effect obtained by a configuration in which rotation of the torsion bar 24 both in the winding direction and in the pull-out direction with respect to the spool 12 is inhibited via the lock gear 32, the operation and effect similar to those of the first embodiment can be obtained.

Further, as described above, by the torsion bar 24 being rotated in the winding direction with respect to the spool 12, movement of the catch projection 26A in the pull-out direction is prevented by the stopping projection 62, and rotation of the torsion bar 24 in the pull-out direction with respect to the spool 12 is prevented. For this reason, rotation of the torsion bar 24 in the pull-out direction with respect to the spool 12 can be prevented by a simple operation, and no special parts used to prevent removal of the torsion bar 24 from the spool 12, which is caused by cancellation of catch of the torsion bar 24 with the spool 12, are required, thereby allowing reduction in the number of parts.

In the present embodiment, the configuration in which one side surface of the catch projection 26A is made planar and the stopping projection 62 is formed on the catch surface 20B is explained. However, an alternative configuration in which a concave portion is formed in the one of the one side surface of the catch projection 26A or the catch surface 20B, and the stopping projection 62 is formed in the other of the one side surface of the catch projection 26A or the catch surface 20B may also be provided. In this case, due to the stopping projection 62 being inserted in (engaged with) the concave portion, movement of the catch projection 26A in the pull-out direction is prevented.

Further, in the present embodiment, although the configuration in which the one side surface of the catch projection 26A is made planar and the stopping projection 62 is formed on the catch surface 20B is explained, an alternative configuration in which the stopping projection 62 is formed in each of the one side surface of the catch projection 26A and the catch surface 20B may also be provided. In this case, because the stopping projection 62 of the catch projection 26A gets over the stopping projection 62 of the catch surface 20B, movement of the catch projection 26A in the pull-out direction is prevented.

Moreover, in the present embodiment, the stopping projection 62 is formed so as to have a semicircular cross sectional configuration, but the stopping projection 62 may also be formed so as to have a semielliptic cross sectional configuration or a polygonal cross sectional configuration (such as a triangular cross sectional configuration or a trapezoidal cross sectional configuration). In this case, preferably, in the stopping projection 62 of the catch surface 20, a surface of the stopping projection 62 at the side of the pull-out direction is inclined such that the surface of the stopping projection 62 at the side of the pull-out direction becomes closer to (nearer) the other side end of the spool 12 in approaching the side of the winding direction, (that is, is inclined toward the side of the winding direction and the other side of the spool 12), and a surface of the stopping projection 62 at the side of the winding direction is arranged perpendicular to the circumferential direction of the spool 12. On the other hand, it is preferable that, in the stopping projection 62 of the catch projection 26A, a surface at the side of the winding direction of the stopping projection 62 is inclined such that the surface at the side of the winding direction of the stopping projection 62 becomes closer to (nearer) the other side end of the spool 12 in approaching the side of the winding direction, (that is, is inclined toward the side of the winding direction and the other side of the spool 12), and a surface of the stopping projection 62 at the side of the pull-out direction is arranged perpendicular to the circumferential direction of the spool 12.

Fourth Embodiment

Figure 7A:
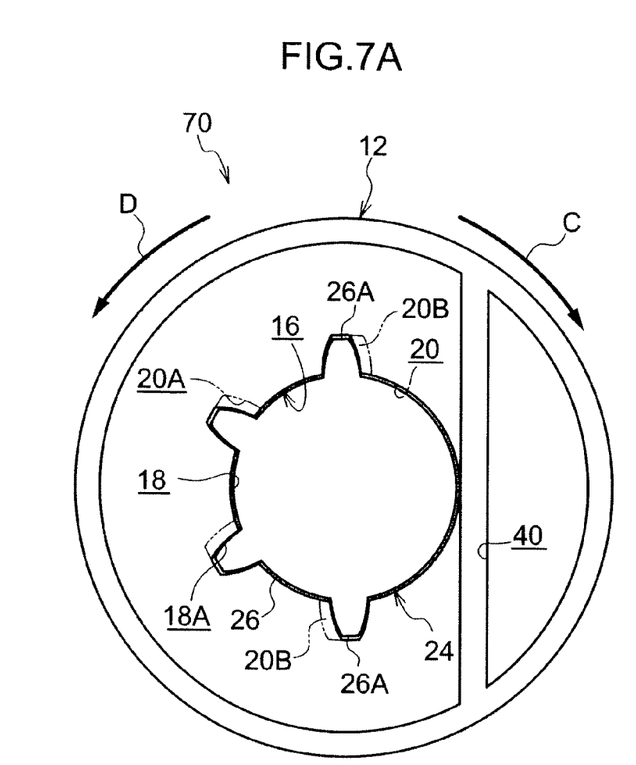
FIG. 7A is a view showing a case in which a torsion bar is inserted in a spool.
Figure 7B:
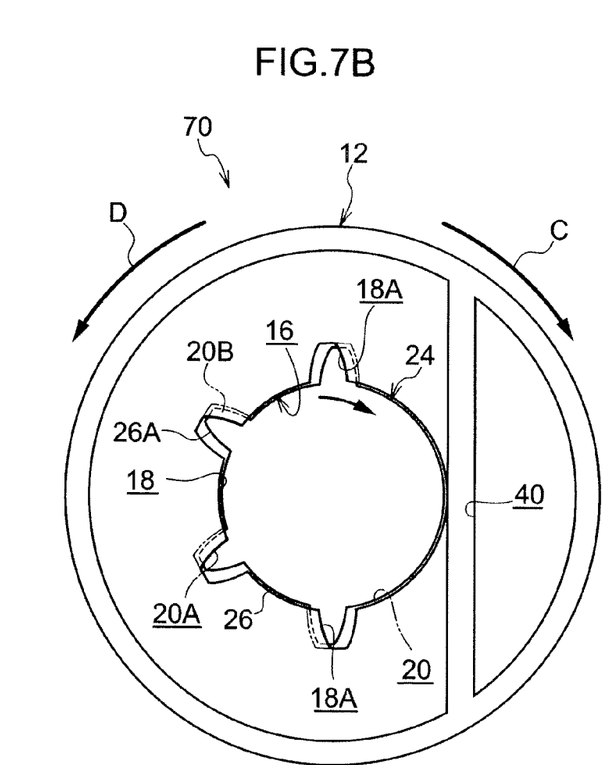
FIG. 7B is a view showing a case in which the torsion bar is rotated in a winding direction with respect to the spool in a state in which the torsion bar is inserted in the spool.

FIGS. 7A and 7B each show a principal part of a webbing take-up device 70 according to a fourth embodiment of the invention.

The webbing take-up device 70 according to the fourth embodiment has substantially same structure as that of the first embodiment excepting the following structure.

As shown in FIGS. 7A and 7B, in the webbing take-up device 70 according to the fourth embodiment, a specified number of (in the present embodiment, two) insertion grooves 18A and the catch grooves 20A (including the catch surfaces 20B) are not provide in a part in the circumferential direction at the serration hole 16 of the spool 12.

The insertion hole 40 of the spool 12 is formed at a peripheral direction position of the spool 12 in which position no insertion groove 18A and no catch groove 20A of the spool 12 are provided. The insertion hole 40 contacts (is very close to) the serration hole 16 (the insertion hole 18 and the catch hole 20).

The specified number of (in the present embodiment, two) catch projections 26A are not provided in a part in the circumferential direction at the serration pillar 26 of the torsion bar 24.

In the present embodiment as well, the same operation and effect as those of the first embodiment can be obtained except for the effect obtained by a configuration in which the predetermined number of catch projections 26A of the torsion bar 24 are caught with the predetermined number of catch surfaces 20B of the spool 12, respectively, at equal intervals in the circumferential direction of the spool.

Further, as described above, the insertion hole 40 of the spool 12 contacts with the serration hole 16 (the insertion hole 18 and the catch hole 20) of the spool 12, and the insertion hole 40 is disposed further at the inner side of the spool 12 in the radial direction than the case of the first embodiment. For this reason, it is possible to reduce the diametrical dimension of the spool 12 while maintaining the rigidity of the spool 12, and the spool 12 can be downsized.

Figure 8:
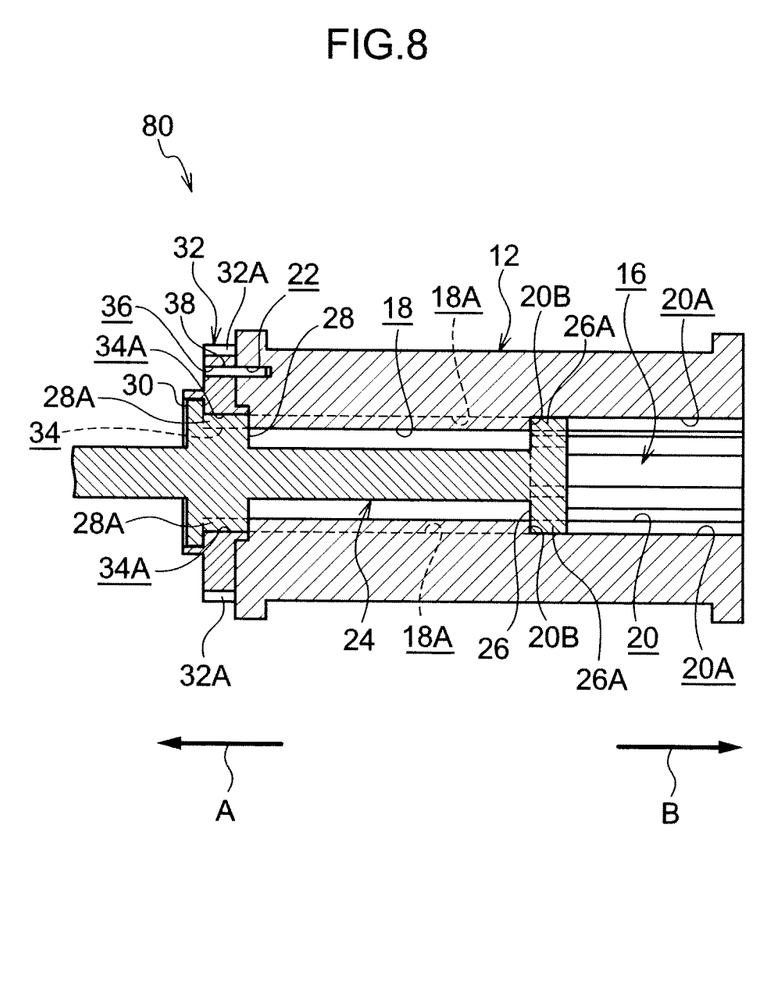
FIG. 8 is a cross sectional view showing another example of the webbing take-up devices according to the first to fourth embodiments of the invention when seen from sideways.

Incidentally, in the above-described first to fourth embodiments, a configuration in which the catch surface 20B of the spool 12, which catches the catch projection 26A of the torsion bar 24, is provided at the other side end portion of the spool 12 is explained. However, for example, as with a webbing take-up device 80 shown in FIG. 8, a configuration in which the axial length of the torsion bar 24 is made smaller, and the catch surface 20B of the spool 12, which catches the catch projection 26A of the torsion bar 24, is provided at the intermediate portion of the spool 12 in the axial direction thereof may also be employed.

What is claimed is:

1. A webbing take-up device comprising:
    a cylindrical spool having an axis of rotation on which a webbing to be applied to a passenger of a vehicle is wound, and a centrally disposed opening having an insertion end and an opposing end;
    at least one insertion groove having two axially-oriented walls parallel to the axis of rotation defined in the surface of the spool opening, the distance between the walls abruptly increasing at an axial location in a direction away from the insertion end of the spool opening to define a catch groove having a catch surface that is located between the walls of the catch groove and is oriented substantially perpendicular to the axis of rotation; and
    a torsion bar that is inserted into the insertion end of the spool opening; and
    a catch projection that is provided on the torsion bar, the thickness of the projection being less than the distance between the walls of the catch groove,
    wherein the catch projection extends beyond the plane of the catch surface in the axial direction in a state in which the torsion bar is inserted into the spool so that the torsion bar is affixed to the spool by the torsion bar being rotated in one direction around the axis of rotation of the spool whereby the catch projection rotates into an assembled position wherein the catch projection overlaps the catch surface in the axial direction.

2. The webbing take-up device of claim 1, wherein the one direction is a webbing winding direction.

3. The webbing take-up device of claim 2, further comprising:
    a mounting member that is mounted to the torsion bar and prevents relative rotation of the torsion bar with respect to the spool in the other direction; and
    a connecting member that connects the spool and the mounting member with each other, and prevents relative rotation of the mounting member with respect to the spool in the other direction.

4. The webbing take-up device of claim 2, wherein the catch surface and the catch projection are engaged with each other when the catch projection is caught at the catch surface, so that relative rotation of the torsion bar with respect to the spool in the other direction is prevented.

5. The webbing take-up device of claim 1, further comprising:
    a mounting member that is mounted to the torsion bar and prevents relative rotation of the torsion bar with respect to the spool in the other direction; and
    a connecting member that connects the spool and the mounting member with each other, and prevents relative rotation of the mounting member with respect to the spool in the other direction.

6. The webbing take-up device of claim 5, wherein the catch surface and the catch projection are engaged with each other when the catch projection is caught at the catch surface, so that relative rotation of the torsion bar with respect to the spool in the other direction is prevented.

7. The webbing take-up device of claim 5, wherein a spool side hole is formed in the spool and a mounting member side hole is formed in the mounting member, the connecting member being inserted into the spool side hole and the mounting member side hole.

8. The webbing take-up device of claim 1, wherein the catch surface and the catch projection are engaged with each other when the catch projection is caught at the catch surface, so that relative rotation of the torsion bar with respect to the spool in the other direction is prevented.

9. The webbing take-up device of claim 1, wherein the catch surface is perpendicular to an axis direction of the spool.

10. The webbing take-up device of claim 1, wherein the catch surface is inclined at at least a portion thereof, such that the catch surface becomes closer to the insertion end of the spool at the other side portion approaching the one direction side.

11. The webbing take-up device of claim 1, wherein a projection for preventing the catch projection from relatively moving in the other direction is formed at at least one of the catch projection and the catch surface.

12. The webbing take-up device of claim 1, wherein additional catch surfaces are disposed at equal intervals in a circumferential direction of the spool, and a plurality of the catch projections are disposed at equal intervals in a circumferential direction of the torsion bar.

13. The webbing take-up device of claim 1, wherein additional the catch surfaces are disposed at a portion of an area in a circumferential direction of the spool, and additional of the catch projections are disposed at a portion of an area in a circumferential direction of the torsion bar.

14. The webbing take-up device of claim 1, wherein an end portion, in the one direction around the axis of rotation of the spool, of the catch groove is one of the walls of the catch groove.

15. The webbing take-up device of claim 1, wherein the distance between the walls abruptly increases at the opposing end of the spool opening.

* * * * *